Figure 1:
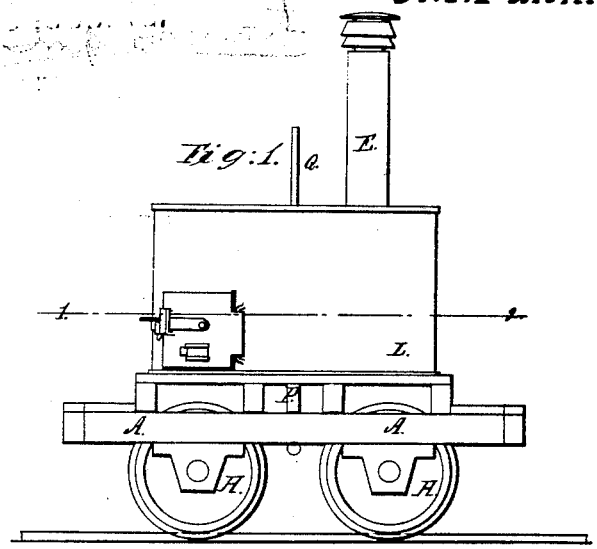
Figure 2:
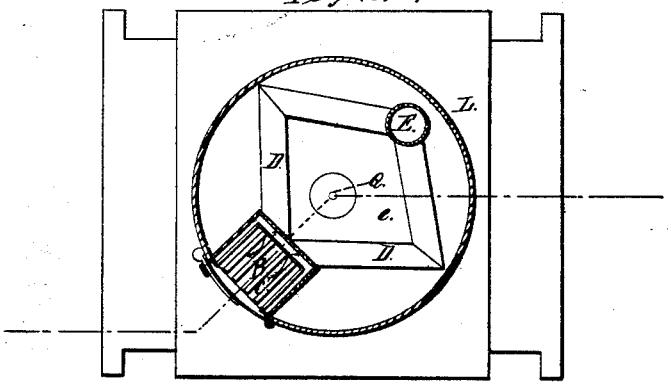
Figure 3:
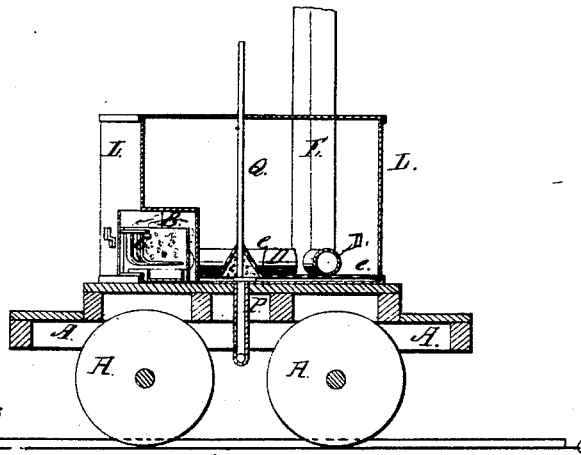

Examiner

W. C. Allison.

Street Sweeper

No. 256. A. I. Patented Nov. 15, 1859.

Witnesses
Geo. P. Owen
L. J. Piers

Inventor:
W. C. Allison

THE GRAPHIC CO. PHOTO-LITH. 39 & 41 PARK PLACE, N.Y.